United States Patent [19]
Mefferd et al.

[11] Patent Number: 5,839,350
[45] Date of Patent: Nov. 24, 1998

[54] MEANS AND METHOD FOR PREPARING A CONTAINER FOR RECYCLING

[76] Inventors: Floyd R. Mefferd, 337 S. 2nd St.; Larry C. Mefferd, 525 Allen St., both of Laurens, Iowa 50554

[21] Appl. No.: 665,796

[22] Filed: Jun. 18, 1996

[51] Int. Cl.⁶ .................................................... F01B 7/00
[52] U.S. Cl. ................... 92/152; 91/519; 100/37; 100/269.05; 100/131; 100/902
[58] Field of Search ........... 92/151, 152; 91/519, 91/170 R; 100/37, 50, 125, 131, 269.05, 269.08, 269.09, 269.14, 902

[56] References Cited

U.S. PATENT DOCUMENTS

| | | | |
|---|---|---|---|
| 1,930,155 | 10/1933 | Wiedmann | 100/269.05 X |
| 4,630,442 | 12/1986 | Massaro et al. | 91/519 X |
| 4,953,682 | 9/1990 | Helbawi | 100/902 X |
| 5,060,564 | 10/1991 | Buford et al. | 100/902 X |
| 5,109,763 | 5/1992 | Morris et al. | 100/902 X |
| 5,165,334 | 11/1992 | Aluotto et al. | 100/902 X |
| 5,174,199 | 12/1992 | King et al. | 100/902 X |
| 5,199,658 | 4/1993 | Bartels et al. | 91/519 X |
| 5,319,933 | 6/1994 | Omberg et al. | 91/519 X |

FOREIGN PATENT DOCUMENTS 4325367  2/1995  Germany ............................... 100/902

*Primary Examiner*—Hoang Nguyen
*Attorney, Agent, or Firm*—Zarley Mckee, Thomte, Voorhees & Sease

[57] ABSTRACT

A press assembly includes a hydraulic cylinder assembly having first and second chambers and respective piston and rod assemblies therein. The rod of the second assembly is arranged to enter the first chamber and thereby raise the pressure therein. Initially, fluid flows into the first chamber, forcing the first rod to exert a force on a work object. When a predetermined pressure is reached within the cylinder, fluid is introduced to the second chamber, and causes the second rod to move into the first chamber, which raises or boosts the pressure in the first chamber.

13 Claims, 3 Drawing Sheets

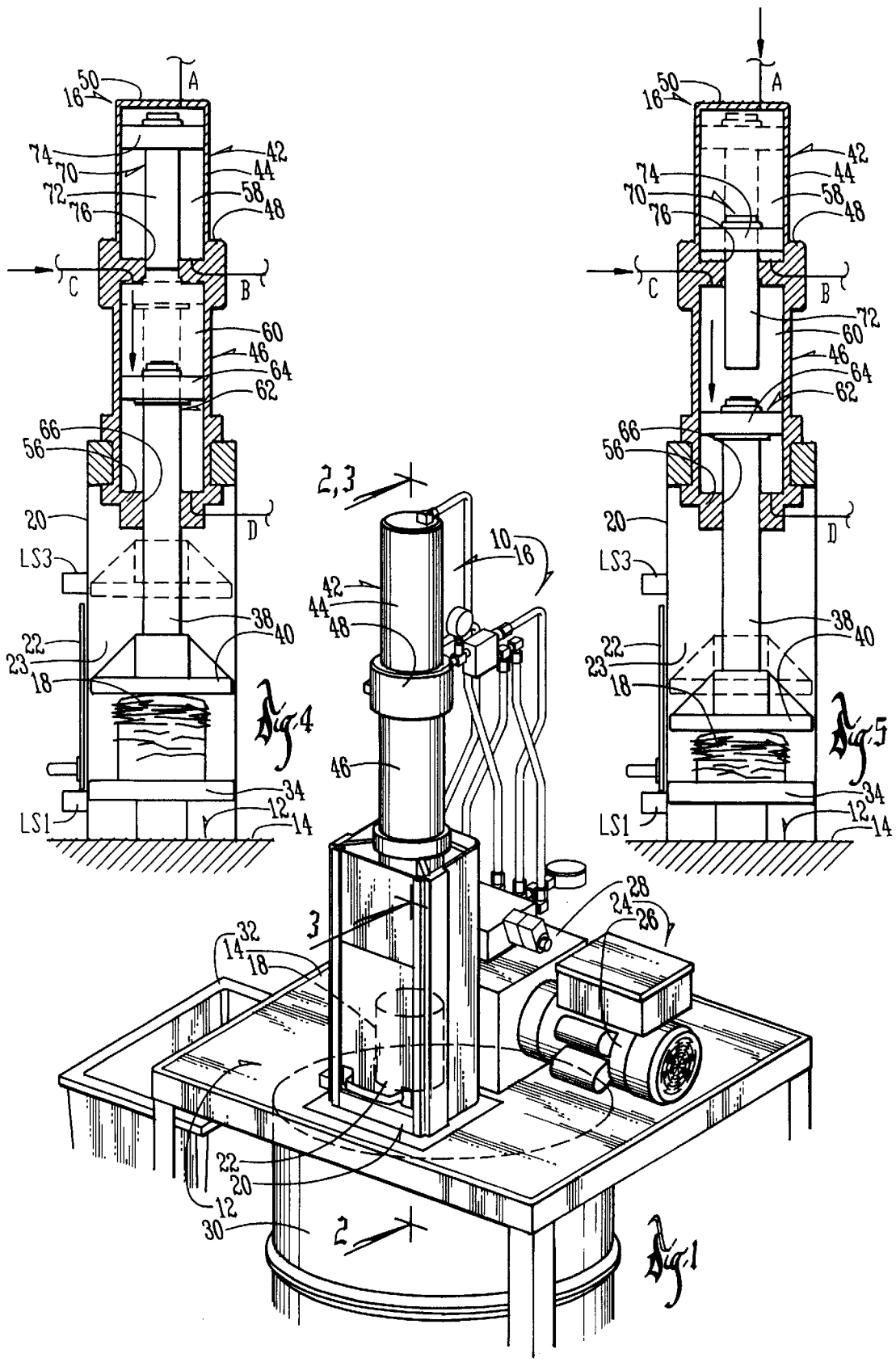

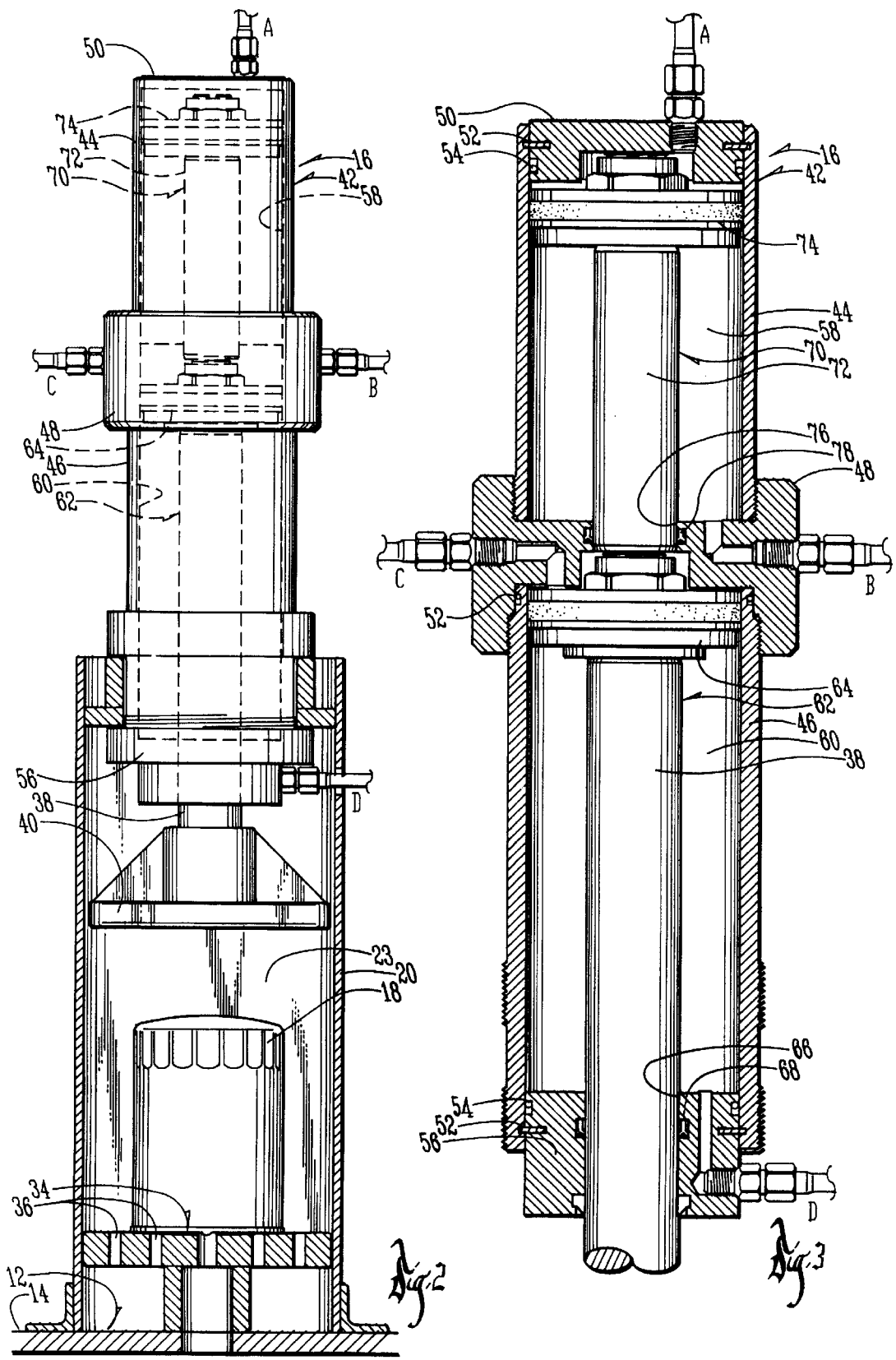

MEANS AND METHOD FOR PREPARING A CONTAINER FOR RECYCLING

BACKGROUND OF THE INVENTION

The present invention relates to the field of recycling containers. More particularly, this invention relates to means and methods for preparing used oil filters for further recycling by crushing the filters and draining the oil from them.

Automotive-style oil filters have a filter element encased by a rigid outer casing. Most conventional casings are constructed of metal. A hole in the casing allows the fluid, usually oil, to flow through the filter element.

Governmental regulations, prompted by concerns about the environment and depletion of nonrenewable energy resources, have spawned efforts to recycle many used containers, including automotive-style oil filters. However, existing methods of crushing oil filters have proven unsuccessful because the resulting crushed filter or puck was unacceptable for further processing by the scrap/smelter industry. The conventionally crushed filters or pucks contain too much residual oil. As a result, such pucks do not burn properly in the smelting furnace or oven. Burning these oil ladened pucks in a smelting furnace also poses an environmental and safety hazard because passing too much oil through the fume scrubbers could cause the bag house system to catch fire. Due to these problems, the smelters have recently refused to accept any oil filter pucks for recycling. Conventionally crushed oil filter pucks are of no value to the smelters. Frankly, the recycling industry has heretofore been at a loss as to what to do with the oil filters. Conventional press assemblies are typically hydraulically operated by fluid supplied from a hydraulic pump that is driven by an electric motor. The electric motor receives current from an electrical power source. Because of its widespread availability in automotive service stations and other sites where the oil filters might be crushed, an electrical power source having an output of 110–120 volts alternating current (AC) is preferred.

Unfortunately, conventional 115 volt press assemblies for crushing the oil filters are capable of generating only about 25 tons of force. Thus, power constraints tend to limit the amount of residual oil that can be removed by existing crushing equipment and methods.

The relatively low crushing force generated by existing press assemblies for crushing oil filters results in pucks that are still fairly bulky. Fewer pucks can be packed into a given volume receptacle, package or truck for transport to a smelting or other recycling facility. Often, the volume rather than the weight of conventionally crushed pucks controls how many can be loaded onto a semi-trailer.

Conventional presses for crushing oil filters leave pucks which have the potential of wasting a significant amount of oil. The oil removed by crushing is typically recyclable. The expelled oil is drained into a drum which can be transported to a recycling refinery. However, the residual oil remaining in the filter after crushing can be lost unless further recycling steps are undertaken. Thus, the more oil that is left in the filter after crushing, the more oil that is potentially lost.

Currently, conventionally crushed filters have to go to a different recycling center for shredding and then separation of the metal, oil and waste. After this cost intensive process, the metal is washed and then sent to the smelter.

Therefore, a primary object of the present invention is the provision of an improved means and method for preparing a container for recycling.

A further object of the present invention is the provision of a means for crushing containers to a smaller volume and expelling a greater quantity of residual fluid therefrom than conventional presses.

A further object of the present invention is the provision of a means for crushing containers that leads to greater utilization of freight space in terms of weight per volume.

A further object of the present invention is the provision of a means for crushing containers which utilizes a 110–120 volt electrical power source yet provides at least 40 tons of crushing force.

A further object of the present invention is a provision of a method for preparing containers for recycling wherein a two-stage cylinder assembly and an electrohydraulic control are utilized to boost the pressing force achievable with a given voltage power source.

A further object of the present invention is the provision of a method for preparing oil filters for smelting without having to shred them.

A further object of the present invention is the provision of an improved crushing device which is economical to manufacture, durable in use, and simple in construction.

These and other objects will become apparent from the description which follows.

SUMMARY OF INVENTION

The present invention relates to a means and method for preparing a container for recycling. The means of this invention is an improved press assembly which includes a hydraulic cylinder assembly having first and second chambers and respective piston and rod assemblies therein. The piston rod of the second assembly is arranged so as to enter the first chamber and thereby raise the pressure therein. Thus, the crushing force applied to the container is effectively boosted.

The press assembly includes a unique electrohydraulic control system which sequences the operation of the press assembly. The operator places the container in the enclosed crushing area adjacent the crushing platten which is attached to the first piston rod. By closing the door on the press assembly the operator trips a limit switch, which turns on a motor to drive a hydraulic pump and moves a solenoid valve into a position that allows fluid to be pumped in sequence to the first and second chambers.

Initially, fluid flows into the first chamber, forcing the first piston rod and crushing platten toward the container. This movement continues until the container is engaged and crushing begins. When a predetermined pressure is reached, an adjustable pressure sequencing valve allows fluid to flow to the second chamber. The pressurized fluid forces the second piston and rod assembly to move toward the first piston and rod assembly and the second piston rod extends into the first chamber, which raises or boosts the pressure in the first chamber. As a result, the press assembly of the present invention crushes the container with even greater force within given power constraints. The invention boosts the crushing force to a value not heretofore attainable with conventional equipment and a given power supply.

BRIEF DESCRIPTION OF THE DRAWINGS

FIG. 1 is a perspective view of the press assembly of the present invention.

FIG. 2 is a cross-sectional view of the press assembly of the present invention taken along line 2—2 in FIG. 1.

FIG. 3 is a cross-sectional view of the cylinder assembly of the present invention taken along line 3—3 in FIG. 1.

FIG. 4 is a schematic diagram illustrating the initial stage of the crushing operation with the present invention wherein the lower or first piston and rod assembly engages and partially crushes the container.

FIG. 5 is a schematic diagram similar to FIG. 4, but shows the subsequent or boosted stage of the crushing operation wherein the upper or second piston rod assembly is forced downward to boost the force that the press assembly exerts on the container.

DETAILED DESCRIPTION OF THE PREFERRED EMBODIMENT

Figure 6:
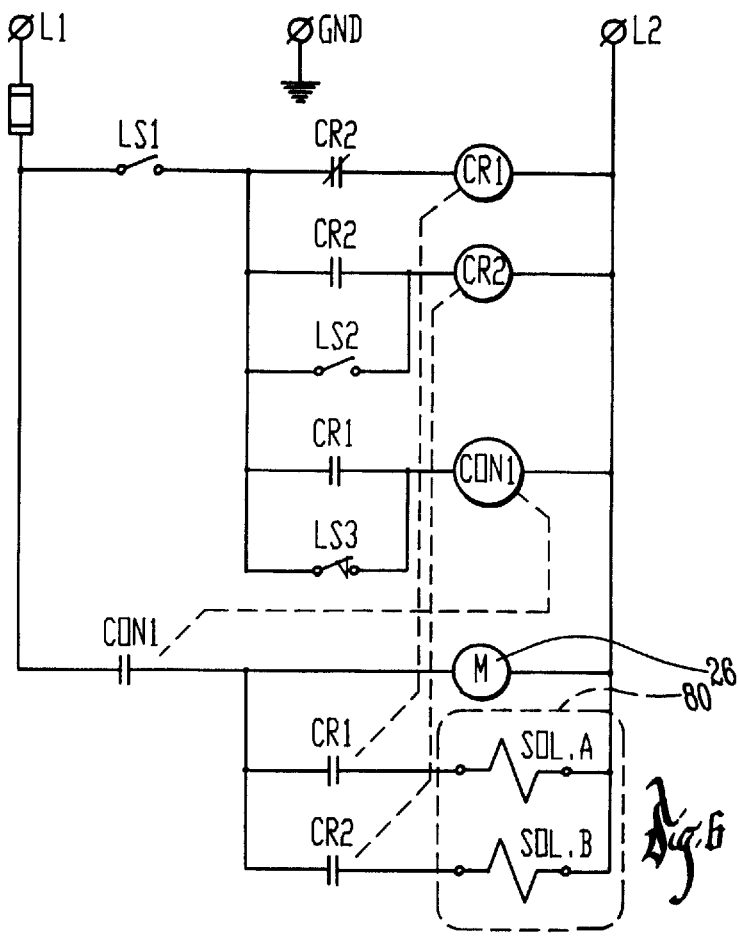
FIG. 6 is an electrical schematic diagram depicting the electronic portion of the electrohydraulic control system of the present invention.

The present invention, which is an improved means and method for preparing a container for recycling, is shown in the figures and described below. The means of the invention includes a press assembly which is generally denoted by the reference numeral 10 in FIG. 1. The press assembly 10 includes a frame or table 12 which has an upper surface 14 for supporting some of the other components.

A cylinder assembly 16 is mounted to the frame 12 and is located above the supporting surface 14 so as to allow sufficient room for a recyclable container 18 to be inserted therebetween. The description of the preferred embodiment that follows is based upon the container 18 being a used automotive-style oil filter, but this invention is applicable to other types of containers as well. The space between the cylinder assembly 16 and the supporting surface 14 is partitioned off by an enclosure 20 having a vertically slidable access door 22 thereon. Preferably the enclosure 20 mounts to the cylinder assembly 16 and to the surface 14. Thus, the enclosure 20 defines a crushing chamber 23 into which the container 18 is placed for crushing.

An electrohydraulic control assembly 24 is mounted on the frame 12 and connected to the cylinder assembly 16. As will be described in greater detail later, the electrohydraulic control assembly 24 includes an electric motor 26 drivingly connected to hydraulic pump 28 (see FIG. 7).

A conventional fifty-five gallon drum 30 is positioned under the oil filter 18 to catch any oil expelled therefrom during the crushing process. The crushed oil filters 18, hereinafter referred to as pucks, can be deposited in a receptacle 32 placed near the press assembly 10. Preferably the receptacle 32 holds about 30 gallons, but other sizes and shapes can be used without detracting from the invention.

Referring to FIG. 2, the oil filter 18 is placed on a platform or a stationary jaw member 34. One or more drain passages extend through the platform 34 and through the supporting surface 14 so as to drain the oil to the drum 30 below. A first piston rod 38 extends from the end of the cylinder assembly 16 adjacent to but spaced apart from the supporting surface 14. A movable jaw member or crushing platten 40 mounts to one end of the first piston rod. As will be understood shortly, the platten 40 is movable because of its attachment to the first piston 38.

As best seen in FIGS. 2 and 3, the cylinder assembly 16 includes an elongated housing 42 having an upper cylinder portion 44 and a lower cylinder portion 46 joined at and separated by a partition or center section 48. The end of the upper cylinder 44 opposite the center section 48 is sealed by a plug 50 held in place by a retaining ring 52. A conventional seal 54 prevents leakage between the outer diameter of the plug 50 and the inner diameter of the cylinder 44. A similar arrangement is found at the end of the lower cylinder 46 opposite the center section 48. A plug 56 is held in place by a retaining ring 52 and sealed by a conventional sealing means or o-ring 54. A sealing means 54 is also included where the lower cylinder 46 is threadingly engaged to the center section 48.

Internally the cylinder assembly 16 has upper and lower sealed chambers 58 and 60, respectively. The lower chamber 60 will also be referred to hereinafter as the first chamber, whereas the upper chamber 58 will be referred to as the second chamber.

A piston and rod assembly 62 is operatively disposed within the first chamber 60. The piston and rod assembly 62 includes the elongated piston rod 38 already mentioned above and a piston 64 attached thereto so as to move axially therewith. A first piston rod receiving hole 66 extends centrally through the plug 56. Thus, the first piston rod 56 extends outside the first chamber 60 through the hole 66. A lip seal or similar sealing means is interposed between the first piston rod 38 and the plug 56 so as to prevent any leakage of hydraulic fluid from the chamber 60.

A second piston and rod assembly 70 is disposed within the second chamber 58 in the upper cylinder 44. The piston and rod assembly 70 comprises a second piston rod 72 and a piston 74 attached thereto so as to be axially movable therewith. The partition or center section 48 includes a second piston rod receiving hole 76 therein. Even with the piston and rod assembly 70 in its uppermost position within the chamber 58, the piston rod 72 extends partially into the center section 48 through the receiving hole 76. A lip seal 78, which is interposed between the piston rod 72 and the center section 48, maintains a seal between the two chambers 58 and 60.

A port A is provided in the plug 50 of the upper cylinder 44. Port A allows pressurized fluid to be applied to the upper face of the piston 74 so as to move the piston and rod assembly 70 in a downward direction in FIG. 3. Another port, referred to in the figures as port B, is provided in the center section 48 and connects with the second chamber 58 so as to provide a drain or exhaust opening below the piston and rod assembly 70. Port C is also provided in the center section 48, but connects to the upper end of the chamber 60. A port D extends into the lower end of the first chamber 60. Port D can alternately drain or allow pressurized fluid to enter the lower end of the chamber 60, thus forcing the piston and rod assembly 62 to retract.

One distinguishing feature of the present invention is its unique electrohydraulic control system for controlling the flow of hydraulic fluid through ports A, B, C, and D so as to efficiently crush the container 18. The electrohydraulic control assembly 24 comprises components of two major types: electrical and hydraulic. Some components are actually hybrids which fit into both categories. One such component is the solenoid valve 80 which appears in both FIG. 6 with the other electrical components and in FIG. 7 with the other hydraulic components. The solenoid valve 80 is a three-position, spring centered valve which can be activated from either end. Hydraulically, the solenoid valve 80 is operatively between the output line 81 of the hydraulic pump 28 and the ports A, B, C, and D. The solenoid valve 80 has four hydraulic ports. At one port on the left in FIG. 7, the output line 81 connects the pump 28 to the solenoid 80. The solenoid valve 80 is connected to the tank or reservoir 82 at a second port on the left. The other two ports of the solenoid valve 80 on the right connect it to the ports of the cylinder assembly 16.

The other components and operation of the present invention can be understood in view of FIGS. 4–7. FIG. 6 shows that power is provided at L1 and L2 with an appropriate ground therebetween.

The initial state of the press assembly 10 is that the door 22 is open and the piston and rod assemblies 62 and 70 are fully retracted. As best seen in FIG. 2, a container 18, such as a used oil filter, is inserted into the enclosure 20 and placed on the stationary jaw member 34. The operator then closes the door 22, which engages and closes the limit switch LS1 (see FIGS. 1 and 4).

Figure 7:
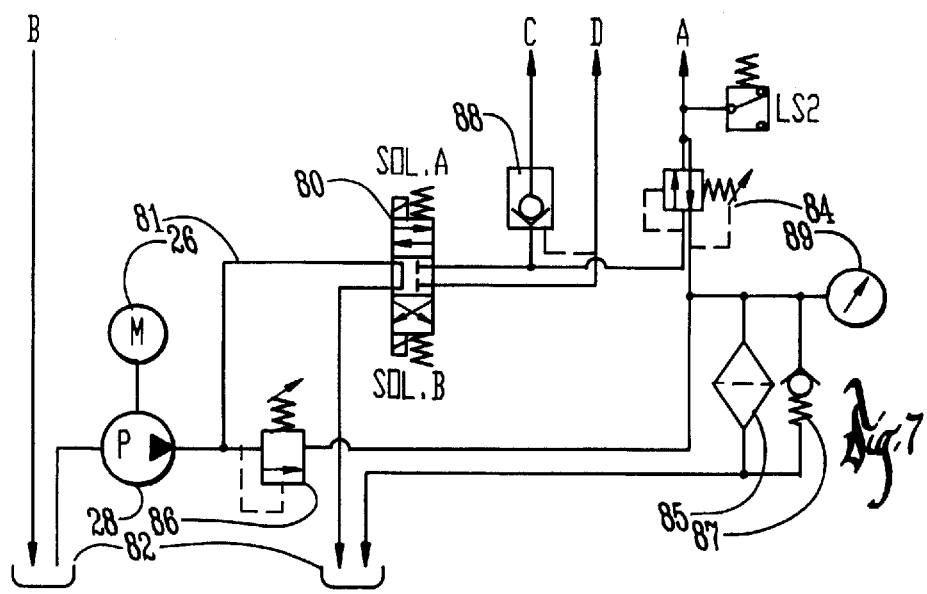
FIG. 7 is a hydraulic schematic diagram depicting the hydraulic portion of the electrohydraulic control system for the press assembly of the present invention.

As seen in FIG. 7, a 110–120 volt (preferably 115 volt) alternating current source of electrical power (not shown) is selectively connectable with a control relay CR1 by the limit switch LS1. When the control relay CR1 is on, two things happen. First, the spring centered three-position solenoid valve 80 (see FIG. 7) moves from its initial centered position to the upper position. More accurately, the actuator SOL. A (see FIGS. 6 and 7) pushes the solenoid 80 to the upper position when it is energized. Meanwhile, control circuit CON1 is also energized, which turns on the 20 ampere, 2 horsepower motor M as shown in FIGS. 6 and 7.

The electric motor M drives the open-circuit hydraulic pump 28, which draws hydraulic fluid from the hydraulic reservoir 82 and delivers it to the rest of the hydraulic portion of the electrohydraulic control system. An adjustable relief valve 86 establishes the predetermined maximum pressure at which the pump 28 delivers fluid. The hydraulic circuit further includes a filter 85, a filter bypass valve 87 and a pressure gauge 89.

The pump 28 pumps fluid through the solenoid 80 and through a normally open pilot operated check valve 88 to port C at the top of the first or lower cylinder 46 (see FIGS. 4 and 7). Once in the first or lower chamber 60, the fluid forces the piston and rod assembly 62 to move or extend downward toward the oil filter 18. Thus, the assembly 62 moves off the limit switch LS3 (see FIGS. 4 and 6). The closing of the limit switch LS3 locks control circuit CON1 on. The motor M will now stay on until the assembly 62 fully retracts and reopens the limit switch LS3.

When the movable jaw or platten 40 contacts the oil filter 18, and begins to crush it as shown in FIG. 4, the pressure in the lower chamber 60 will rise. This pressure will be evident at port C and at the adjustable pressure sequence valve 84 in FIG. 7. When the pressure reaches the predetermined value of the valve's setting the sequence valve 84 ports hydraulic fluid to the second or upper chamber 58 through port A. This occurs when the rod 38 has extended the platten 40 to the position shown in solid lines in FIG. 4. FIG. 5 shows the same position in dotted lines.

FIG. 5 illustrates that the pressurized fluid entering the upper chamber 58 through port A forces the piston and rod assembly 70 downward. As a result, the lower end of the upper or second piston rod 72 moves into the upper part of the lower chamber 60. The piston rod 72 displaces part of the hydraulic fluid in the lower chamber 60, thereby driving the pressure in the chamber 60 higher because the check valve 88 and the piston 64 prevent the escape of the fluid. The increased pressure in the chamber 60 translates into increased crushing force. With this added boost, the platten 40 moves from the dotted line position to the position indicated by solid lines in FIG. 5. In the process, the platten 40 crushes the oil filter 18 into a more compact puck than would have otherwise been possible with a conventional press assembly having the same type of power source. This is important because most automotive service stations, where oil filters are frequently crushed, have only 110–120 volt power. Electrical power sources with 220–240 volt output are harder to find and more costly to operate.

As the oil filter 18 is crushed, substantially all of the residual oil trapped inside is expelled and drains to the drum 30 through the passages 36 in the platform 34 and the surface 14.

The pressure in chamber 58 rises as the platten 40 crushes the filter 18, eventually reaching a predetermined value equal to the setting of the pressure limit switch LS2 (see FIGS. 5–7). The limit switch LS2 turns on the control relay CR2, which turns off solenoid valve actuator SOL. A and turns on solenoid valve actuator SOL. B. The extending portion of the cycle is terminated and the retracting portion of the cycle begins. The solenoid valve actuator SOL. B pushes the solenoid valve 80 into the lower position, which puts ports A and C in communication with the reservoir 82. Fluid from the pump 28 is also ported to port D to retract the piston and rod assemblies 62 and 70. Assembly 70 is pushed back into place by the retraction of assembly 62. The pressure limit switch LS2 resets during the retraction.

When the assemblies 62 and 70 are fully retracted, they trip limit switch LS3 which turns off control circuit CON1. Consequently, the motor M stops and solenoid valve 80 returns to the centered or neutral position. The operator opens the door 22, which resets the limit switch LS2 and returns all circuits to their initial states. The operator then removes the puck and deposits it in the receptacle 32 for storage, transport and later recycling.

In the preferred embodiment the pistons 64 and 74 are approximately 4.5 inches in diameter. The pistons rods 72 and 38 have outside diameters of approximately 1.75 and 2.5 inches, respectively. The electric motor M is a 20 ampere, 2 horsepower, alternating current motor. As mentioned earlier, the power source providing current to the motor M can be of the 110–120 volt alternating current type that is readily available in service stations and the like.

As is evident from FIG. 7, various settings of the relief valves and switches of the present invention are possible. In the preferred embodiment the adjustable relief valve 86 is set at approximately 1300–1700 psi, preferably 1500 psi. The adjustable pressure sequencing valve 84 opens at approximately 900 to 1100 psi, preferably 1000 psi. The pressure switch/limit switch LS2 closes at about 1000 to 1100 psi, preferably approximately 1100 psi.

With these preferred settings, the first piston and rod assembly 62 will be urged downward until the pressure in the first chamber 60 reaches 1000 psi and the oil filter 18 is partially crushed to the extent shown in FIG. 4. Then the pressure sequence switch 84 opens and allows fluid from the pump 28 to be ported to the upper or second cylinder 44 through port A. Thus, the second piston and rod assembly 70 is forced downward so the second piston 74 extends into the first chamber 60. Displacement of the fluid in the first chamber 60 by the second piston 74 boosts the pressure in the first chamber and thereby increases the crushing force applied to the container 18. When the pressure in the upper or second chamber 58 reaches 1100 psi, the pressure/limit switch LS2 is tripped and the actuator SOL. B pushes solenoid valve 80 into the lower position shown in FIG. 7. Consequently, fluid is routed from the pump 28 to port D, filling the lower part of the first chamber 60 so as to forcibly retract the first piston and rod assembly 62. Eventually, the first piston and rod assembly 62 contacts the second piston rod 72 and forces the second piston and rod assembly 70 to retract as well.

The use of the preferred embodiment of the present invention results in improved crushing of the container or oil filter 18. The preferred embodiment has been found to expel over 95% of the residual oil in the filter 18. A compact crushed puck about ⅝ inches in height results. The present invention applies a final crushing force of approximately forty to fifty tons, preferably forty-five to fifty tons, and more preferably forty-seven tons. To provide an adequate margin of error and allow for deterioration of the crushing force as the machine ages, it is recommended that the machine be initially designed and set for fifty tons.

In the preferred embodiment, the initial position of the bottom of the second piston rod 72 is approximately 12.675 inches from the stationary jaw member 34. The second piston and rod assembly 70 has a length of about 11.625 inches and a stroke of approximately 9 inches. The first piston and rod assembly 62 has a length of approximately 19.5 inches and a stroke of approximately 12.625 inches. When 1000 psi is applied to port C, the first piston and rod assembly 62 extends about 10.5 inches. This extension crushes the oil filter 18 to a height of approximately 1.25 inches. Thence when 1000 psi is applied to the upper or second piston and rod assembly 70, the second piston rod 72 enters the first chamber 60 and raises the pressure therein to approximately 5500 to 6500, preferably about 6000 psi. This crushes the container even more.

The crusher described above can thoroughly crush most conventional oil filters used in automobiles, trucks, and most light industrial applications. Filters up to about 12.5 inches tall and 6.5 inches in diameter can be accomodated in the press assembly. A proportionally larger machine is also contemplated to handle paint cans, five gallon metal buckets, metal drums holding sixteen, thirty, or fifty-five gallons, and locomotive filters which are approximately sixteen inches in diameter and thirty-six inches long. The same efficient hydraulic/electrical press assembly concept disclosed herein can be used on very large crushers for other applications crushing various containers and materials.

Thus, one skilled in the recycling art will appreciate that the present invention shows that low power/high force crushing is the answer to the recycling industry's query of what to do with oil filters. This invention allows the filters to be more completely crushed and then sent directly for smelting rather than stockpiled or shredded and washed. The smelters can now safely and efficiently melt the oil filter pucks into reusable metal which may be used to fabricate new oil filters. Thus, the recycling loop can truly be closed so that waste and pollution is minimized.

It will be appreciated that the present invention can take many forms and embodiments. The cylinder assembly can be of a different size or oriented differently. The true essence and spirit of this invention are defined in the appended claims. It is not intended that the embodiment of the invention presented herein should limit the scope thereof.

What is claimed is:

1. A method for preparing a used oil filter and the oil therein for recycling, the used oil filter including a casing covering a filter element and containing oil therein and having an opening therein, the steps of the method comprising:

placing the used oil filter between first and second opposing members, one of the first and second opposing members being driven by a double piston electrohydraulic boosting assembly;

supplying approximately 115 volt power to the double piston electrohydraulic boosting assembly;

moving said one of said first and second members toward the other of said first and second members with a force exceeding 40 tons so as to crush the casing to form a smelt-ready puck and expel a substantial amount of the oil therefrom; and removing the smelt-ready puck from the press.

2. The method of claim 1 further comprising the step of draining the oil expelled from the casing to a reservoir below the jaws of the press.

3. The method of claim 1 wherein the force exerted on the casing is 45 to 50 tons.

4. The method of claim 1 wherein the force exerted on the casing exceeds approximately 47 tons.

5. The method of claim 1 further comprising the step of depositing the smelt-ready puck in a receptacle for transport to a smelting operation without performing a shredding operation prior to the smelting operation.

6. The method of claim 1 wherein the oil is drained to the reservoir through a drain passage in one of the first and second members.

7. The method of claim 1 wherein the exerting of the force is sequenced by an electrohydraulic control system connected to the press so as to define an initial stage and a subsequent boosted stage before any retraction of the members.

8. The method of claim 1 wherein the step of exerting force exceeds 40 tons on the casing comprises using a first piston and rod assembly to move one of the first and second members toward the other of the first and second members with a first force of less than 40 tons and then boosting the hydraulic pressure within the piston and rod assembly to exert a force exceeding 40 tons on the one of the first and second members.

9. The method of claim 8 and further comprising introducing fluid at a first pressure into a cylinder chamber containing the piston and rod assembly for exerting the first force on the one of the first and second members, and for then inserting a displacement member into said cylinder chamber to displace the fluid within the-cylinder chamber and increase the fluid pressure therein above the first fluid pressure.

10. A device for crushing a fluid container, comprising:

a frame having a surface thereon for supporting the container;

a hydraulic cylinder assembly mounted on the frame generally opposite and spaced apart from the surface, the cylinder assembly having a housing defining first and second sealed chambers, the first and second chambers each having an inlet port and an outlet port respectively, a first piston rod receiving hole extending through the housing into the first chamber, a second piston rod receiving hole extending through the housing into the first chamber;

a first piston assembly operatively disposed in the first chamber and comprising a first piston rod having a piston axially fixed thereon, the first piston being located between the inlet port of the first chamber and the outlet port of the first chamber, the extended end of the first piston rod including a crushing platten mounted thereon;

a second piston assembly operatively disposed in the second chamber and comprising a second piston rod having a second piston axially fixed thereon, the second piston being located between the inlet port of the second chamber and the outlet port of the second chamber, the second piston rod extending into the second piston rod receiving hole;

a pump for supplying pressurized fluid to the inlet ports of the first and second chambers; and a control system for controlling and sequencing the delivery of pressurized fluid to the first inlet port and then to the second inlet port to force the second piston rod through the second piston rod receiving hole and into the first chamber thereby boosting pressure in the first chamber and thereby applying additional force to the crushing platten;

the control system including an adjustable pressure sequence valve connectable to the pump and connectable with the inlet port of the second chamber, the sequence valve being in parallel with a check valve disposed in a line connectable with the inlet port of the first chamber and the pump.

11. The device of claim 10 wherein the control system includes a pressure and limit switch interposed between the sequence valve and the inlet port of the second chamber.

12. A method for boosting fluid pressure within a hydraulic cylinder having a cylinder chamber therein and a piston movably mounted within the cylinder chamber for reciprocating movement therein, the method comprising:

introducing fluid into the cylinder chamber on one side of the piston at a first fluid pressure;

inserting a displacement member into the cylinder chamber to displace a predetermined volume of the fluid therein and increase the fluid pressure above the first fluid pressure;

using a 115 volt power source to drive a 110 volt hydraulic motor so as to move the piston to exert a load force on an oil filter in response to the introducing and inserting steps;

choosing the first fluid pressure so as to cause the piston to exert a load force less than 40 tons on the oil filter before the inserting step; and displacing sufficient fluid during the inserting step to cause the piston to exert a load force greater than 40 tons on the oil filter.

13. A method according to claim 12 and further comprising using the hydraulic pump to introduce fluid at the first fluid pressure to a booster hydraulic prime mover for causing the booster hydraulic prime mover to move the displacement member into the cylinder chamber during the inserting step.

* * * * *